US008546671B2

(12) United States Patent
Chaney et al.

(10) Patent No.: US 8,546,671 B2
(45) Date of Patent: Oct. 1, 2013

(54) ACCESSORY FOR STRING INSTRUMENTS

(76) Inventors: Daniel L. Chaney, Atlanta, GA (US); Mark P. McJunkin, Atlanta, GA (US)

( * ) Notice: Subject to any disclaimer, the term of this patent is extended or adjusted under 35 U.S.C. 154(b) by 0 days.

(21) Appl. No.: 13/414,849

(22) Filed: Mar. 8, 2012

(65) Prior Publication Data

US 2012/0227565 A1 Sep. 13, 2012

Related U.S. Application Data

(60) Provisional application No. 61/450,394, filed on Mar. 8, 2011.

(51) Int. Cl.
*G01D 3/00* (2006.01)

(52) U.S. Cl.
USPC .......... 84/318

(58) Field of Classification Search
USPC .......... 84/312 R, 317, 318, 313
See application file for complete search history.

(56) References Cited

U.S. PATENT DOCUMENTS

2010/0224049 A1* 9/2010 Tran .......... 84/318

* cited by examiner

*Primary Examiner* — Kimberly Lockett
(74) *Attorney, Agent, or Firm* — Ryan S. Schneider, Esq.; Troutman Sanders LLP

(57) ABSTRACT

An accessory for a string instrument including a body portion and a clamping portion that is coupled to the body portion by a connecting portion having at least one point of connection. The body portion includes at least one surface capable of altering the position or sound of one or more strings of an instrument. The body portion can include a slide, a capo, both, and/or other surfaces or features configured to alter the sound or position of the instrument's strings.

20 Claims, 15 Drawing Sheets

ACCESSORY FOR STRING INSTRUMENTS

CROSS-REFERENCE TO RELATED APPLICATIONS

This application claims the benefit of U.S. Provisional Application No. 61/450,394 filed 8 Mar. 2011, the entire contents and substance of which is hereby incorporated by reference.

BACKGROUND OF THE INVENTION

1. Field of the Invention

This invention relates generally to an accessory for string instruments, and more particularly to combination capo and slide.

2. Description of Related Art

Musicians commonly employ various accessories while playing string instruments. These accessories may modify the sounds of string instruments and/or ease the difficulties commonly associated with playing string instruments. Such devices include, for example, capos, slides, and picks.

A capo is a device that depresses one or more of the strings of an instrument. On a guitar, for instance, a capo depresses the strings against the fretboard at the point of the capo's attachment, thereby increasing the frequency of the sound emitted by shortening the effective length of the strings. A capo may also allow a musician to avoid depressing one or more of the string by hand, which is often difficult and tiresome over extended periods.

Capos typically attach to the neck of an instrument by a clamping mechanism or a tightly-wrapped elastic band. As a result, adjusting the position of a capo is not easy, especially while playing an instrument.

Another device commonly employed by musicians is a slide. A slide is a tool that typically includes a hard material in the shape of a cylinder. The cylinder is typically placed over a finger on the hand used to hold the instrument's neck. The slide shortens the vibratory length of the strings upon contact, thereby altering the pitch of the contacted strings. By moving the slide towards or away from the body of the instrument while contacting the strings, the musician can create a distinctive sound.

The slide, however, typically prevents the finger on which it is worn from flexing and depressing a string. Therefore, depressing a string with a slide finger requires removal and storage of the slide, typically in a pocket or on a microphone stand.

What is needed, therefore, is an accessory that overcomes at least one or all of the above-described disadvantages. It is to such accessories, systems and methods that that present invention is primarily directed.

BRIEF SUMMARY OF THE INVENTION

Briefly described, in a preferred form, the present invention comprises an accessory for a string instrument. In one embodiment, the accessory comprises a body portion and a clamping portion that is coupled to the body portion by a connecting portion having at least one point of connection. The body portion comprises at least one surface capable of altering the position or sound of one or more strings of an instrument.

In some embodiments, the body portion comprise a slide, a capo, or both. In other embodiments, the body portion can comprise other surfaces or features configured to alter the sound or position of the instrument's strings.

In one embodiment, the accessory is configured to be repositionable along the neck of an instrument without being detached from the instrument. In other embodiments, the accessory comprises an indexing mechanism. In one embodiment, the indexing mechanism is configured to allow the body portion to selectively rotate about an axis of rotation.

The present invention can comprise an accessory for a stringed instrument including a body portion incorporating a first surface capable of altering the position or sound of one or more strings of an instrument, a clamping portion placing the first surface of the body portion in proximity to one or more strings of an instrument, and maintaining the placement of the first surface until readjusted or repositioned, and a connecting portion connecting the body portion to the clamping portion. The first surface can be substantially curved and/or form a cylinder.

The first surface can comprise a stringed instrument slide, or a stringed instrument capo.

The connecting portion can comprise one or more connection points between the body portion and the clamping portion.

In another exemplary embodiment, the present invention can comprise an accessory for stringed instrument comprising a body portion incorporating a slide and capo, a clamping portion for clamping the body portion to a stringed instrument, and maintaining the placement of the body portion until readjusted or repositioned, a connecting portion connecting the body portion to the clamping portion, and a body portion adjustment control mechanism enabling a user to control which portion of the body portion to place in proximity to one or more strings of a stringed instrument.

The slide can comprise a cylindrical body with a bore and be connectable to the connecting portion via a stob insertable into an end of the slide.

The capo can comprise a capo bar having a trough, a cylindrical end piece and a capo damper receivable in the trough, the capo connectable to the connecting portion via the cooperative engagement of the stob insertable into an end of the slide and the cylindrical end piece.

The clamping portion can comprise an axle and roller, the body portion in proximity to a stringed surface of a stringed instrument having one or more strings, and the clamping portion in proximity to a back surface of the stringed instrument.

The accessory can further comprise a rocker assembly including the body portion adjustment control mechanism, the rocker assembly for positioning the body portion into a slide mode and a capo mode. The rocker assembly can comprise a saddle, rocker, pivot, a body portion connection assembly, a clamping portion connection assembly, and the body portion adjustment control mechanism.

The saddle and rocker can be connected via the pivot comprising a rocker pivot pin, and a body portion side of the rocker assembly can be attached to the body portion via the body portion connection assembly including the connection of a portion of the stob insertable through an aperture in the body portion side of the rocker assembly, and capped with a capo knob.

The clamping portion side of the rocker assembly can be attached to the clamping portion via the clamping portion connection assembly including the connection of a portion of the axle and the rocker, and a rocker portion of the axle can be threaded and threadingly engage a cooperative portion of the rocker extending below the pivotal connection of the saddle to the rocker.

The body portion adjustment control mechanism can comprise a capo adjustment, and a slide adjustment and knob, wherein the capo adjustment comprises a capo adjustment screw threadably engagable with a capo adjustment aperture in the rocker, the capo adjustment screw capped with a bump stop attached to saddle, and wherein the slide adjustment comprises a slide adjustment screw threadably engagable with a slide adjustment aperture in the rocker.

In another exemplary embodiment, the present invention can comprise an accessory for a stringed instrument comprising a body portion incorporating a slide and capo, the body portion placeable in proximity to a stringed surface of a stringed instrument having one or more strings, wherein the slide comprises a cylindrical body with a bore and connectable to the connecting portion via a stob insertable into an end of the slide, wherein the capo comprises a capo bar having a trough, a cylindrical end piece, and a capo damper receivable in the trough, the capo connectable to the connecting portion via the cooperative engagement of a stob insertable into an end of the slide and the cylindrical end piece, a clamping portion for clamping the body portion to a stringed instrument, and maintaining the placement of the body portion until readjusted or repositioned, wherein the clamping portion comprises an axle and roller, and wherein the clamping portion is placeable in proximity to a back surface of the stringed instrument, and a rocker assembly connecting the body portion to the clamping portion, and for positioning the body portion into a slide mode and a capo mode.

The slide can comprise a material selected from the group consisting of metal, glass, and polymeric material, and the capo damper can comprise a material selected from the group consisting of rubber, leather, another polymeric material, and another natural material.

The accessory can be configured to be repositionable along a neck of a string instrument without being detached from the neck of the instrument.

These and other objects, features and advantages of the present invention will become more apparent upon reading the following specification in conjunction with the accompanying drawing figures.

BRIEF DESCRIPTION OF THE DRAWINGS

Various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1A:
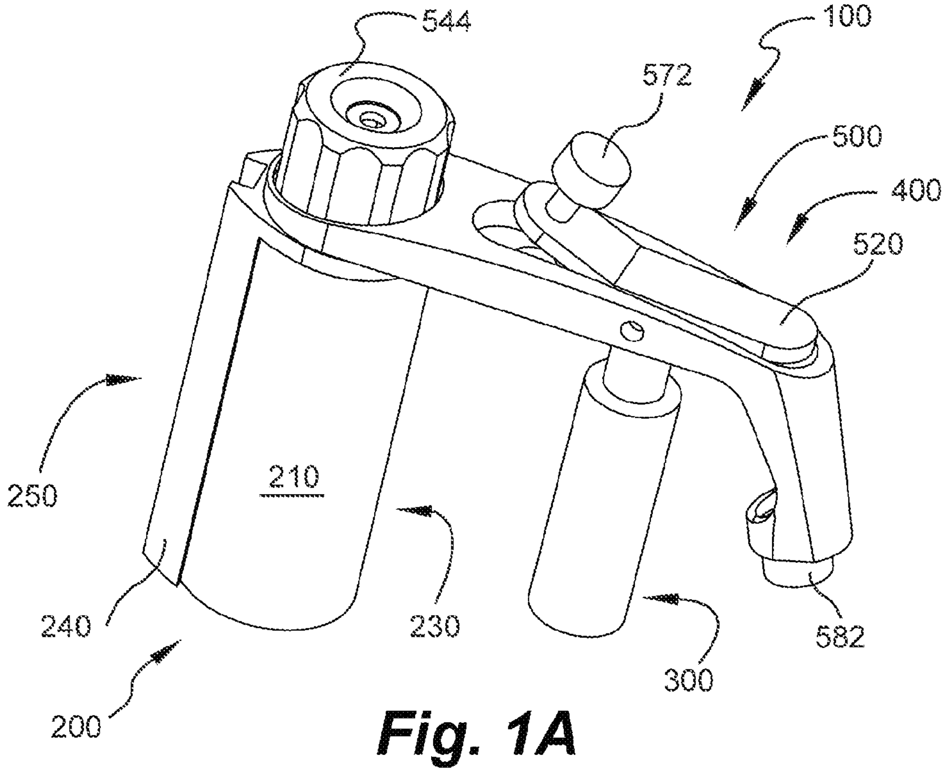
FIG. 1A is a perspective view of a preferred embodiment of the present invention, wherein the invention is in a slide mode.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The present invention preferably is an assembly 100 comprising a body portion 200, a clamping portion 300, and a connecting portion 400. In a preferred embodiment, the assembly 100 comprises a body portion 200 incorporating a slide 230 and capo 250, a clamping portion 300 that enables the assembly 100 to be readjusted or repositioned along the neck of a string instrument, and a connecting portion 400 connecting the body portion 200 to the clamping portion 300.

The present invention 100 further comprises an adjustment, selecting or positioning scheme that adjusts placement of the slide and/or capo in proximity to the strings of an instrument, or in other words, enables the user to select whether the invention acts as a slide or capo (or other surface capable of altering the position or sound of one or more strings of an instrument). The adjustment scheme/mechanism at times will be discussed herein as a separate feature, or incorporated into one or more of the portions 200, 300, 400. It will be understood by those of skill in the art that the assembly's ability to change from a slide to a capo, and/or to adjust the relative proximity of the slide/capo to the strings for different acoustic outcomes, can be accomplished in numerous ways, and does not rely on any particular description as being a "separate" feature of the invention, or if elements of the adjustment mechanism are described as being parts of one or more of the portions 200, 300, 400.

Figure 1B:
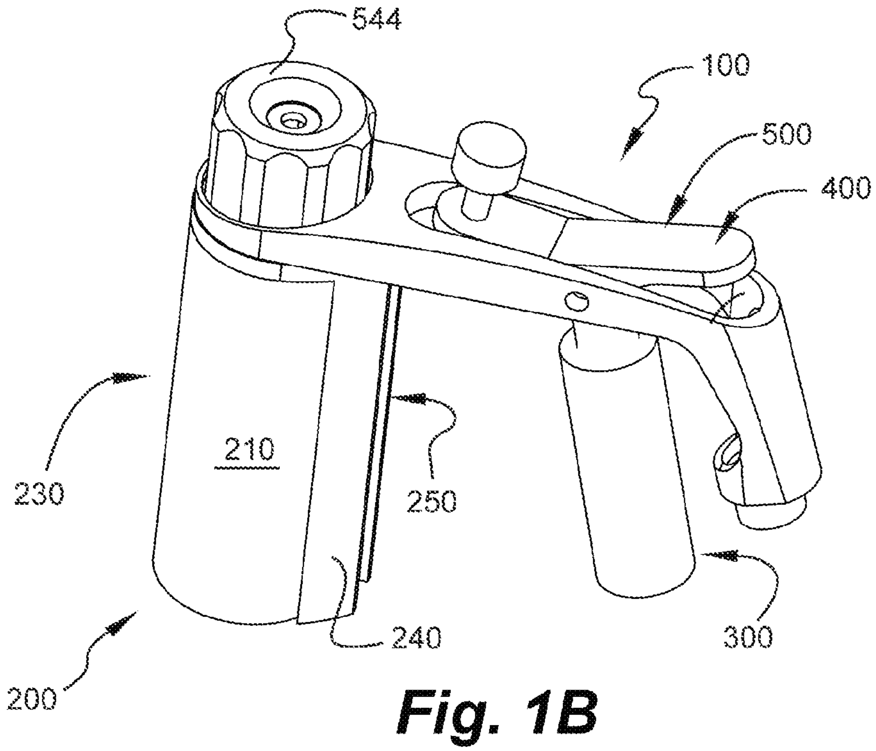
FIG. 1B is a perspective view of the invention of FIG. 1A, wherein the invention is in a capo mode.
Figure 2:
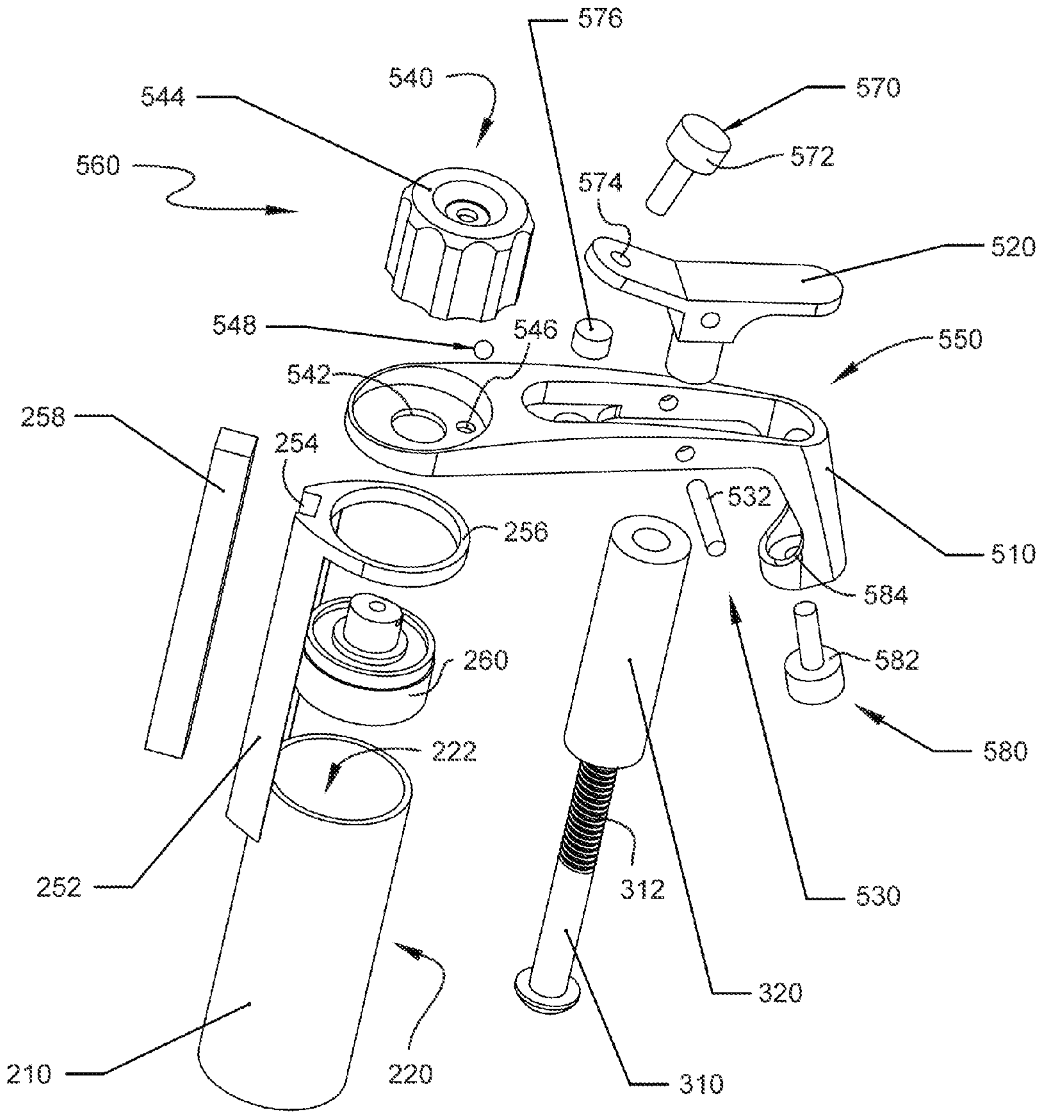
FIG. 2 is an exploded view of the invention of FIG. 1.

As shown in FIGS. 1-3, in an exemplary embodiment of the present invention 100, the body portion 200 comprises at least a first surface 210 capable of altering the position or sound of one or more strings of an instrument. In an exemplary embodiment, the first surface 210 of the body portion 200 is substantially curved. For example, the first surface 210 can form a substantially cylindrical body 220. The body 220 can comprise a bore 222 or a hollow interior area for receiving one or more fingers. In an exemplary embodiment, surface 210 of the body portion 200 capable of altering the position or sound of one or more strings of an instrument comprises a slide 230. In exemplary embodiments, the slide 230 is formed of one or more of metal, glass, or suitable polymeric or composite materials.

The body portion 200 can comprise a second surface 240 capable of altering the position or sound of one or more strings of an instrument. In an exemplary embodiment, second surface 240 of the body portion 200 capable of altering the position or sound of one or more strings of an instrument comprises a capo 250. The capo 250 can be configured to compress one or more strings against a fret, fretboard, or neck of an instrument.

As shown clearest in FIG. 2, body portion 200 can comprise both a slide 230 and capo 250. The slide 230 can comprise the cylindrical body 220 with bore 222. A stob 260 is insertable into an end of the slide 230, and the capo 250 fittable over the same end. The capo 250 can comprise a capo bar 252 having a trough 254 and a cylindrical end piece 256. A capo damper 258 can be received in the trough 254. The capo damper 258 can comprise, for example, rubber or other polymeric, or natural materials such as leather.

Assembly 100 further comprises clamping portion 300 that enables the assembly 100 to be readjusted or repositioned along the neck of a string instrument. Clamping portion 300 can comprise an axle 310 and roller 320.

Assembly 100 further comprises connecting portion 400 connecting the body portion 200 to the clamping portion 300. In an exemplary embodiment, the connecting portion 400 is a rocker assembly 500 capable of positioning the body portion 200 into a slide mode and a capo mode.

The rocker assembly 500 can comprise a saddle 510, rocker 520, pivot 530, a body portion connection assembly 540, a clamping portion connection assembly 550, and body portion adjustment control mechanism 560.

In an exemplary embodiment, the saddle 510 and rocker 520 are connected via pivot 530 comprising a rocker pivot pin 532. A body portion side of the rocker assembly 500 is attached to the body portion 200 via body portion connection assembly 540 including the connection of a portion of the stob 260 insertable through an aperture 542 in the body portion side of the rocker assembly, and capped with a capo knob 544. A detent 546, detent ball 548 and attendant biasing members (not shown in FIGS. 1-3) complete the body portion connection assembly 540.

A clamping portion side of the rocker assembly 500 is attached to the clamping portion 300 via clamping portion connection assembly 550 including the connection of a portion of the axle 310 and the rocker 520. A rocker portion 312 of the axle 310 can be threaded, and threadingly engage a cooperative portion of the rocker 520 extending below the pivotal connection of the saddle 510 to the rocker 520.

Body portion adjustment control mechanism 560 can include a capo adjustment 570 and a slide adjustment 580 and knob 544. Capo adjustment 570 can comprise a capo adjustment screw 572 threadably engagable with a capo adjustment aperture 574 in the rocker 520, the screw 572 capped with a bump stop 576 attached to saddle 510. Slide adjustment 580 can comprise a slide adjustment screw 582 threadably engagable with a slide adjustment aperture 584 in the rocker 520.

As shown in FIG. 1A, the rocker assembly 500 is in the slide mode, as the capo knob 544 is disengaged, the rocker assembly under coil spring tension. As shown in FIG. 1B, the rocker assembly 500 is in the capo mode, as the rocker 520 pushes the capo adjustment screw 572 into the bump stop 576. As shown, in the slide mode, slide 230 can now engage the strings of the instrument, and in the capo mode, capo 250 can now engage the strings of the instrument.

Figure 3A:
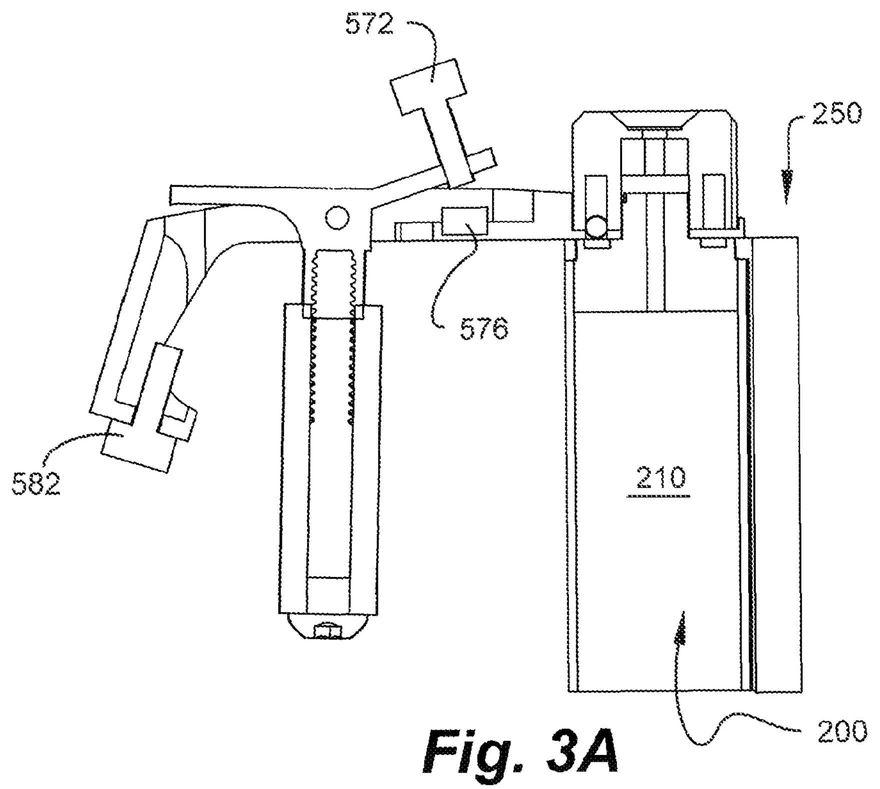
FIG. 3A is a cross-sectional view of FIG. 1A.

As shown in FIG. 3A, the rocker 520 pulls tension and also modulates distance of instrument neck variations in the slide mode. The slide adjustment screw 582 can pull via an idler insert portion on a coil spring (not shown), and on the other end, the rocker 520.

Figure 3B:
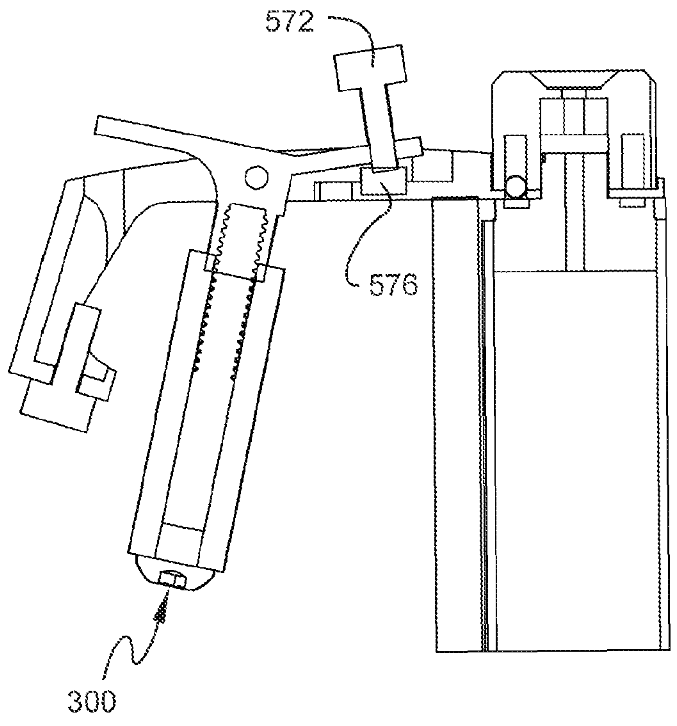
FIG. 3B is a cross-sectional view of FIG. 1B.

As shown in FIG. 3B, in the capo mode, the capo adjustment screw 572 engages the bump stop 576 for adjustment of the clamp force. The capo knob 544 can turn 180° to decrease the distance between the first surface 210 and rock the rocker 520 to bottom out the capo adjustment screw 572.

Although in one exemplary embodiment, the body portion 200 incorporates both a slide 230 and capo 250, in other embodiments, the body portion 200 can comprise yet another surface or device configured to alter the position or sound of a string instrument. For example, the body portion 200 can comprise a surface of device configured to scrape, vibrate, or mute the strings, or produce harmonics.

Figure 4:
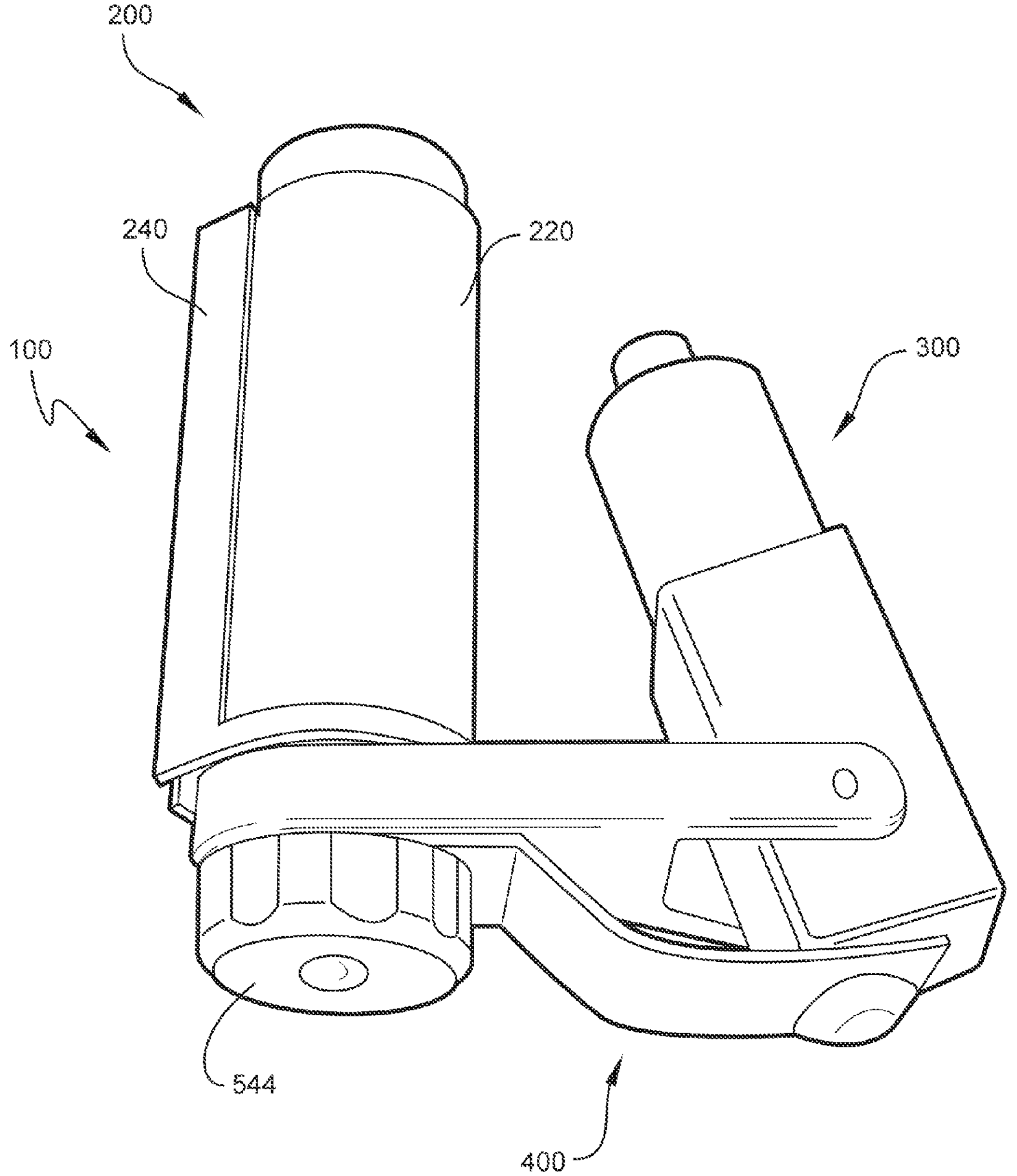
FIG. 4 is a perspective view of another preferred embodiment of the present invention, wherein the invention is in a slide mode.

FIG. 4 illustrates another exemplary embodiment of assembly 100 comprising connecting portion 400 connecting the body portion 200 to the clamping portion 300, wherein the connecting portion 400 is slightly different than the rocker assembly 500, although it remains capable of positioning the body portion 200 into a slide mode and a capo mode.

Figure 5:
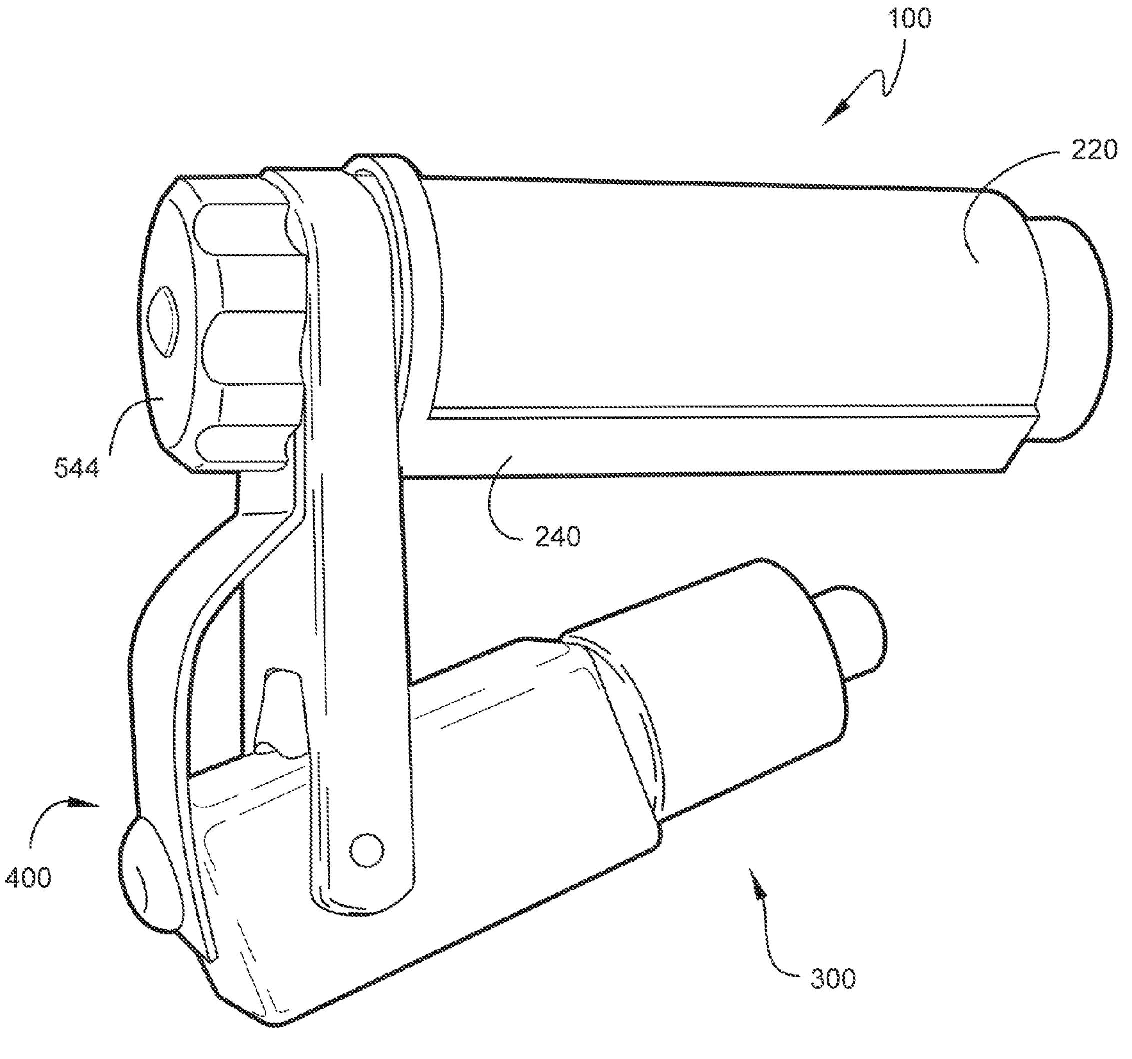
FIG. 5 is a perspective view of the invention of FIG. 4, wherein the invention is in a capo mode.

FIG. 4 illustrates the assembly 100 in the slide mode, and FIG. 5 illustrates the assembly 100 in the capo mode.

Figure 6:
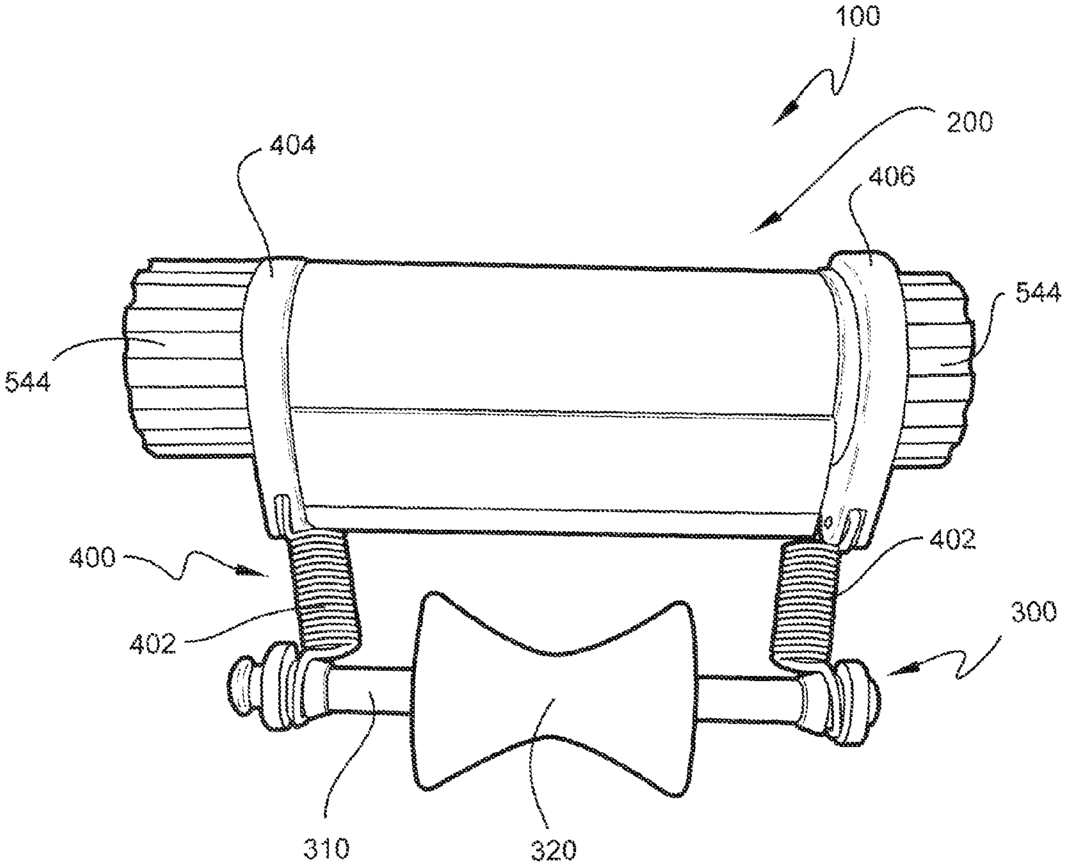
FIG. 6 is a perspective view of another preferred embodiment of the present invention, wherein the invention is in a capo mode.

FIG. 6 illustrates another exemplary embodiment of assembly 100 comprising connecting portion 400 connecting the body portion 200 to the clamping portion 300, wherein the connecting portion 400 connects the clamping portion 300 at two ends via biasing members to the body portion 200.

In this exemplary embodiment, the capo 230 is incorporated into the structure of the body portion 200. In this embodiment, the relevant portion of the body portion can be curved or shaped to correspond with the contour of the neck of an instrument. In another embodiment, the capo 230 can comprise, for example, rubber or a polymeric material affixed to a base that is, in turn, attached to the body portion 200. In these embodiments, the base can comprise metal, a polymeric material, or a composite material. In particular embodiments, a portion of the base can be curved or shaped to correspond with the contour of the neck of an instrument.

In an exemplary embodiment, a muting material can be arranged adjacent to the capo 250. The muting material, in certain embodiments, can be arranged on the side of the capo 250 that is closest to the instrument's tuning pegs when the capo is engaged. In other embodiments, the muting material can be affixed to the body portion or the capo's base. In some embodiments, the muting material can comprise felt, cloth, or other suitable materials capable of dampening or limiting unwanted vibrations.

As shown in the embodiment of FIG. 6, the body portion adjustment control mechanism 560 can comprise two (or more) knobs. In a particular embodiment, the body portion adjustment control mechanism 560 comprises one knob 544 affixed to each opposite end of the body portion 200. In another embodiment, at least one of the knobs 544 can be hollow to accommodate one or more fingers into the bore 222 of the body portion 200. In a further embodiment, the one or more knobs 544 can comprise a groove or depression for receiving the particular connecting elements of connecting portion 400 shown in FIG. 6.

The assembly 100 of FIG. 6 comprises clamping portion 300 coupled to the body portion 200 by two connections 402 of connecting portion 400. The roller 320 of the clamping portion 300 can rotate in a manner that enables the assembly 100 to be readjusted or repositioned along the neck of a string instrument.

In some embodiments, the roller 320 is a guide positioned on the axle 310 and is free to rotate on the axle. In another embodiment, the guide 320 can be secured to the axle 310 to prevent the guide 320 from rotating about the axle 310.

In another embodiment, the guide 320 can be configured to substantially conform to the neck of an instrument. In one embodiment, the guide 320 can comprise, for example, rubber or other polymeric material. In one particular embodiment, the rubber or polymeric material should be soft enough not to damage the string instrument.

In one embodiment, the axle 310 can comprise metal or other durable materials. In a further embodiment, the axle 310 can comprise grooves or depressions configured to correspond with the guide 320, the biasing connections 402, or both.

As described above, the body portion 200 can be connected to the clamping portion 300 via the connecting portion 400 comprising one or more connecting points. The assemblies 100 of FIGS. 1-5 incorporate one connecting point, while the assembly 100 of FIGS. 6-11 incorporates two.

In an exemplary embodiment, the at least one connection of connecting portion 400 comprises a material having elasticity. For example, connections can comprise a spring 402. In another embodiment, the at least one connection can comprise a means for attaching the at least one connection to the roller and the body. In one embodiment, one or more of the means for attaching the at least one connection to the roller and the body is detachable. Non-limiting examples of the means for attaching the at least one connection include a loop, hook, clip, pin, snap, peg, buckle, etc. The means for attaching the at least one connection can be made of suitable material or materials, including, but not limited, to metal, plastic, fabric, leather, polymeric material, composite material, etc.

Generally, the at least one connection can be attached to the clamping portion 300 in a manner that allows the axle 310/roller 320 to rotate relative to the at least one connection. In the particular embodiments comprising two connections, one connection may be attached to one end of the axle 310, and the second connection can be attached to the other end of the axle 310.

When, in certain embodiments, the clamping portion 300 comprises an axle 310, the at least one connection may be attached to the end or ends of the axle 310. In a particular embodiment, the axle 310 comprises a groove or depression designed for receiving the means for attaching the at least one connection. In yet another particular embodiment, the means for attaching the at least one connection is detachable from the axle 310. In a further embodiment, the at least one connection is attached to the axle 310 in a manner that enables rotation of the axle 310 relative to the at least one connection.

In one embodiment, the at least one connection may comprise a spring 402. In a particular embodiment, the spring 402 comprises a tension coil spring. In another embodiment, the spring 402 comprises a loop on one end, and either a loop, partial loop, or hook on the other end. In this embodiment, the loop can be attached to the axle 310 and the partial loop or hook can be detachably attached to, for example, the substantially cylindrical body 220 or one of the knobs 544.

In another embodiment, the at least one connection is attached to the body 220 or one of the knobs 544 in a manner that allows rotation of the body 220 relative to the at least one connection. In yet another embodiment, the assembly 100 comprises two connections—a first connection can be detachably attached to one knob, and a second connection can be attached to the second knob.

As shown in FIG. 6, the body portion adjustment control mechanism 560 includes a first knob and a second knob 544. Attached to the first knob and second knob are two connections 402. The connection attached to the first knob is attached with a plastic loop 404. The connection attached to the second knob is detachably attached with a plastic hook 406. The two connections 402 are also attached to either ends of the axle 310 by metal loops.

In a particular embodiment, the body portion adjustment control mechanism 560 can be configured to allow the body portion 200 to selectively rotate about an axis of rotation. In another embodiment, the body portion 200 can selectively rotate independently of the at least one connection. In a further embodiment, the body portion adjustment control mechanism 560 can be configured to allow the body portion 200 to rotate between a first position in which the slide 230 contacts one or more strings of the instrument, and a second position in which a capo 250 contacts one or more strings of the instrument. In yet another embodiment, the body portion 200 can be rotated by turning one or more of the knobs.

Figure 7:
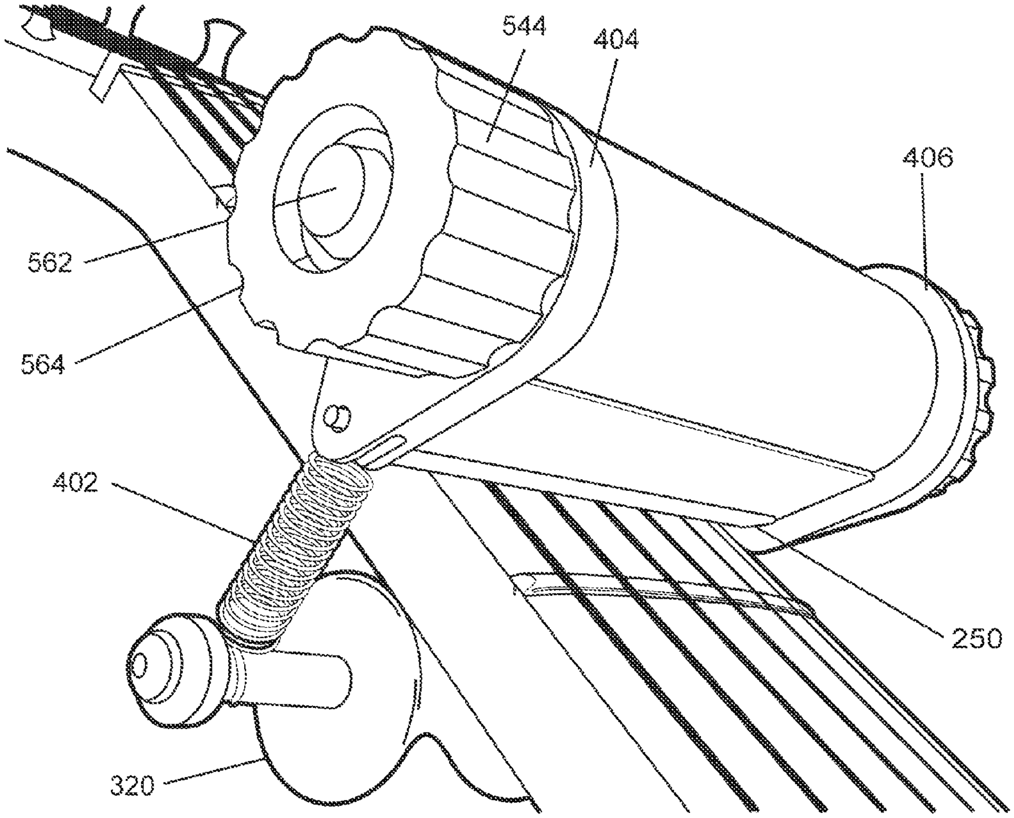
FIG. 7 is a perspective view of the present invention of FIG. 6 attached to an acoustic guitar.

FIG. 7 is a perspective view of the assembly of FIG. 6 attached to the neck of an acoustic guitar. In FIG. 7, the body portion of the assembly has been rotated so that the capo 250 contacts the strings of the acoustic guitar. The rotation of the body portion 200 is controlled by the body portion adjustment control mechanism 560 comprising the first knob 544, plastic loop 404, knob axle 562, and knob cap 564. The knob axle 562 is secured to the inside of the body 220 using an adhesive or some other method. The plastic loop 404 is affixed around the knob axle 562 via an aperture in its center. The first knob 544 is then affixed to the knob axle 562 via an aperture in its center. Raised, hemispherical features on the end of the first knob 544 align with hemispherical indentions on the side of the plastic loop 404 that faces the first knob 544. The interaction of these features creates an indexing action when the body portion 200 is rotated. A spring can be inserted into the open top of the first knob 544. The knob cap 564 is attached to the end of the knob axle 562, which compresses the spring slightly and secures the assembly; therefore, the knob and body may rotate independently of the plastic loop 404.

Figure 8:
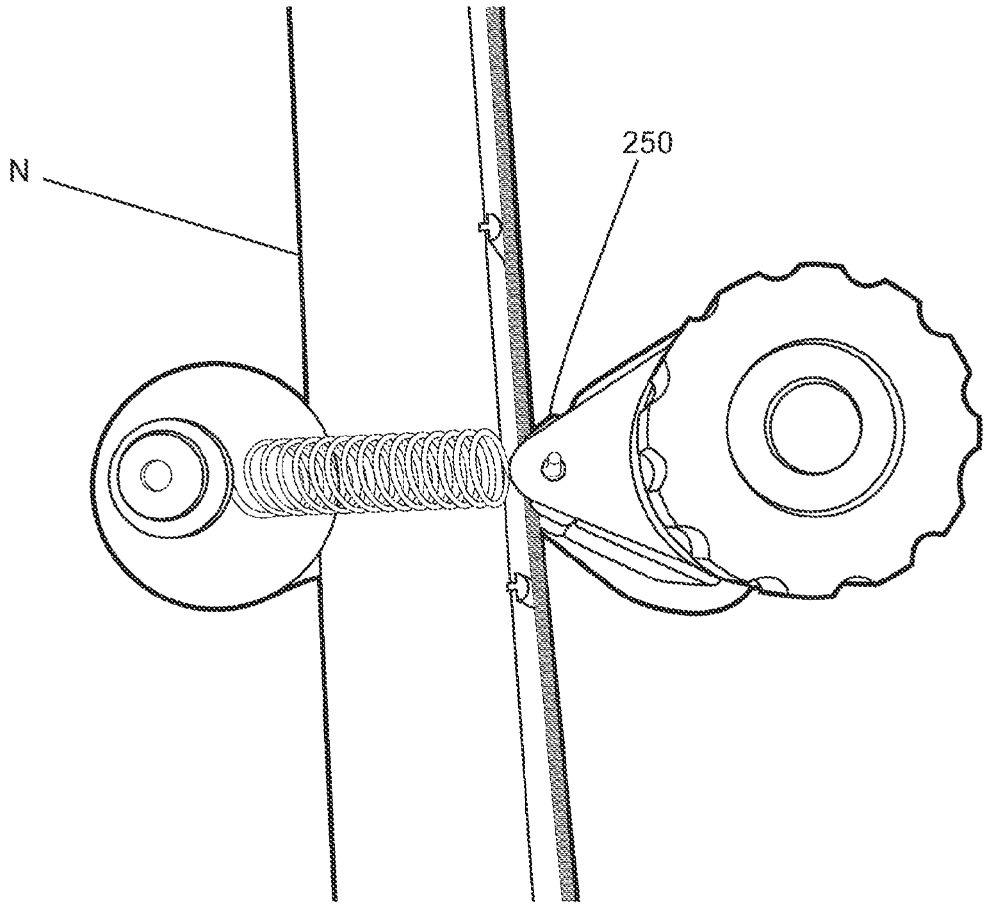
FIG. 8 is a side view of the present invention of FIG. 6, wherein the invention is in a capo mode.
Figure 9:
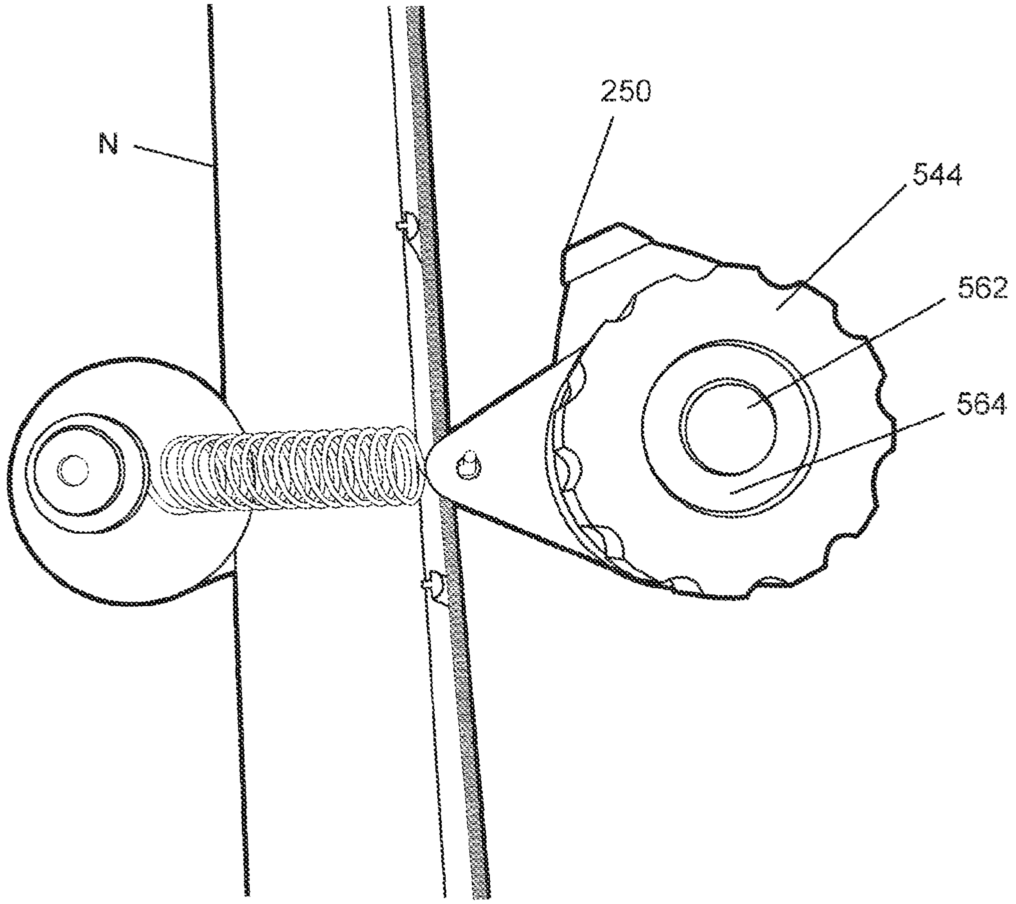
FIG. 9 is a side view of the present invention of FIG. 6, wherein the invention is in a slide mode.

FIGS. 8 and 9 illustrate the assembly attached to the neck N of the instrument and rotated into different positions. FIG. 8 shows the body in a position with the capo 250 engaging the strings. FIG. 9 shows the body in a position with the slide engaging the strings.

In one embodiment, the assembly 100 can be configured to be repositionable along the neck of an instrument without being detached from the neck of the instrument. In certain embodiments, the assembly can be configured to rest above an instrument's nut without substantially influencing or affecting the sounds emitted by the instrument's strings.

Figure 10:
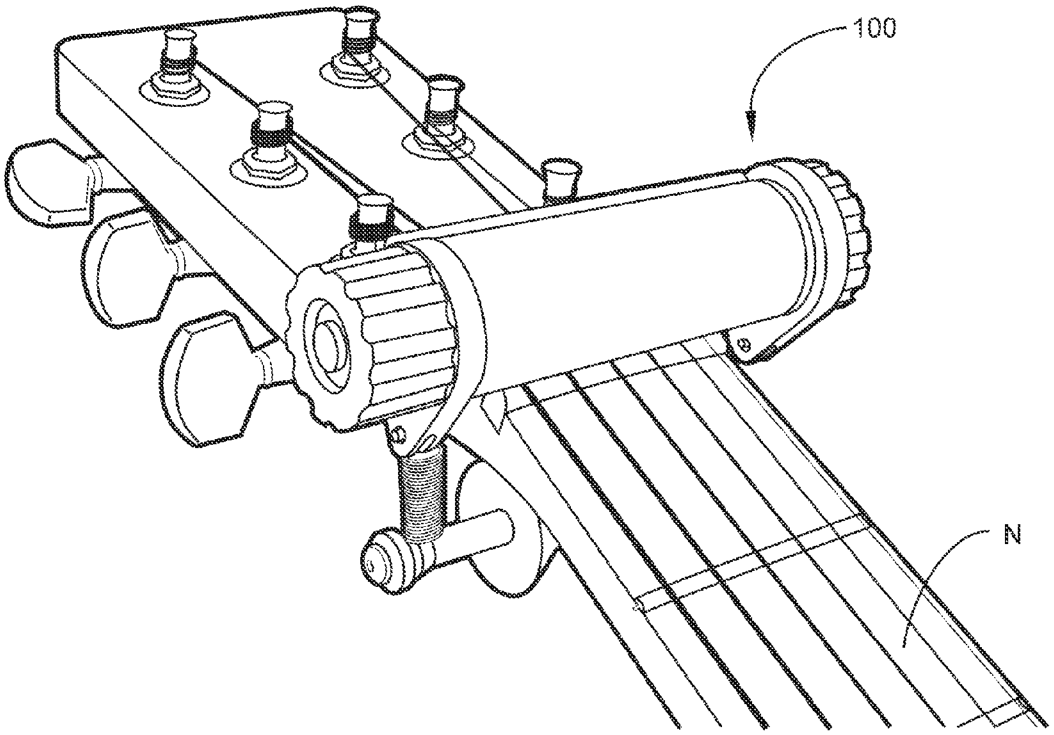
FIG. 10 is a perspective view of the present invention of FIG. 6 shown in a storage position above the nut of an instrument.

FIG. 10 is an illustration of the assembly of FIG. 6 that has been placed above the nut of an acoustic guitar. Generally, the assembly of FIG. 6 can be kept in this position while not in use; the assembly may be configured to avoid substantially affecting the sound of the instrument while in this position.

Figure 11A:
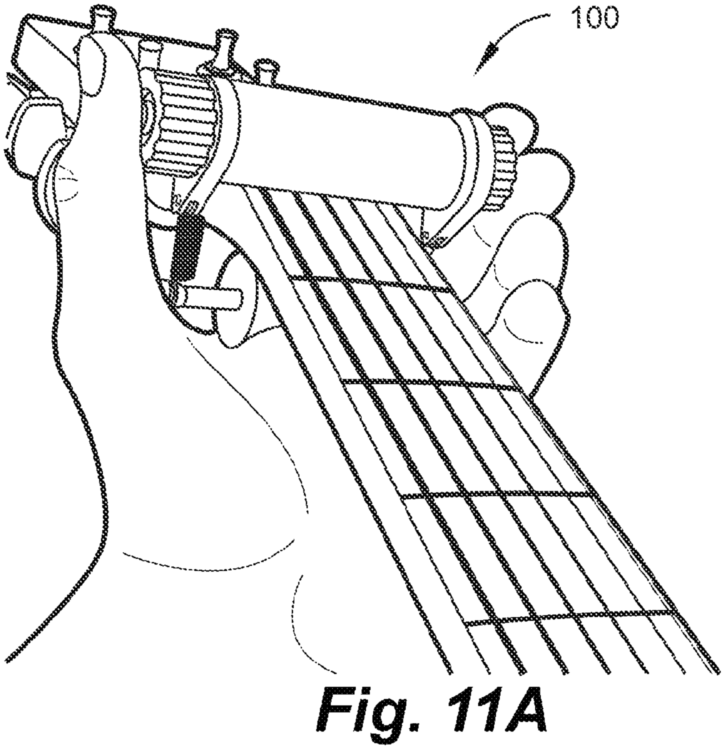
FIGS. 11A and 11B are perspective views of the present invention of FIG. 6 shown before (FIG. 11A) and after (FIG. 11B) its repositioning along the neck of an acoustic guitar.
Figure 11B:
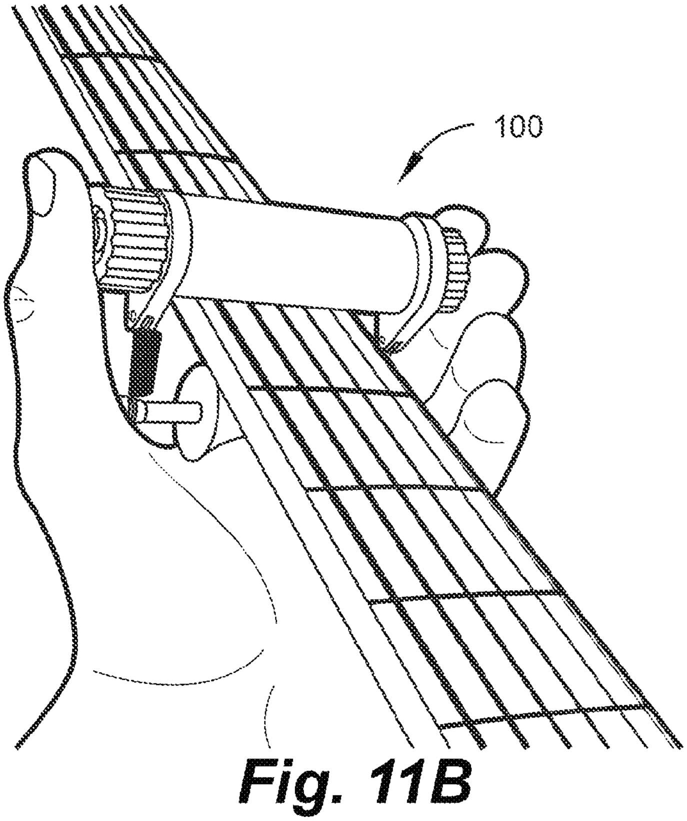
Figure 12:
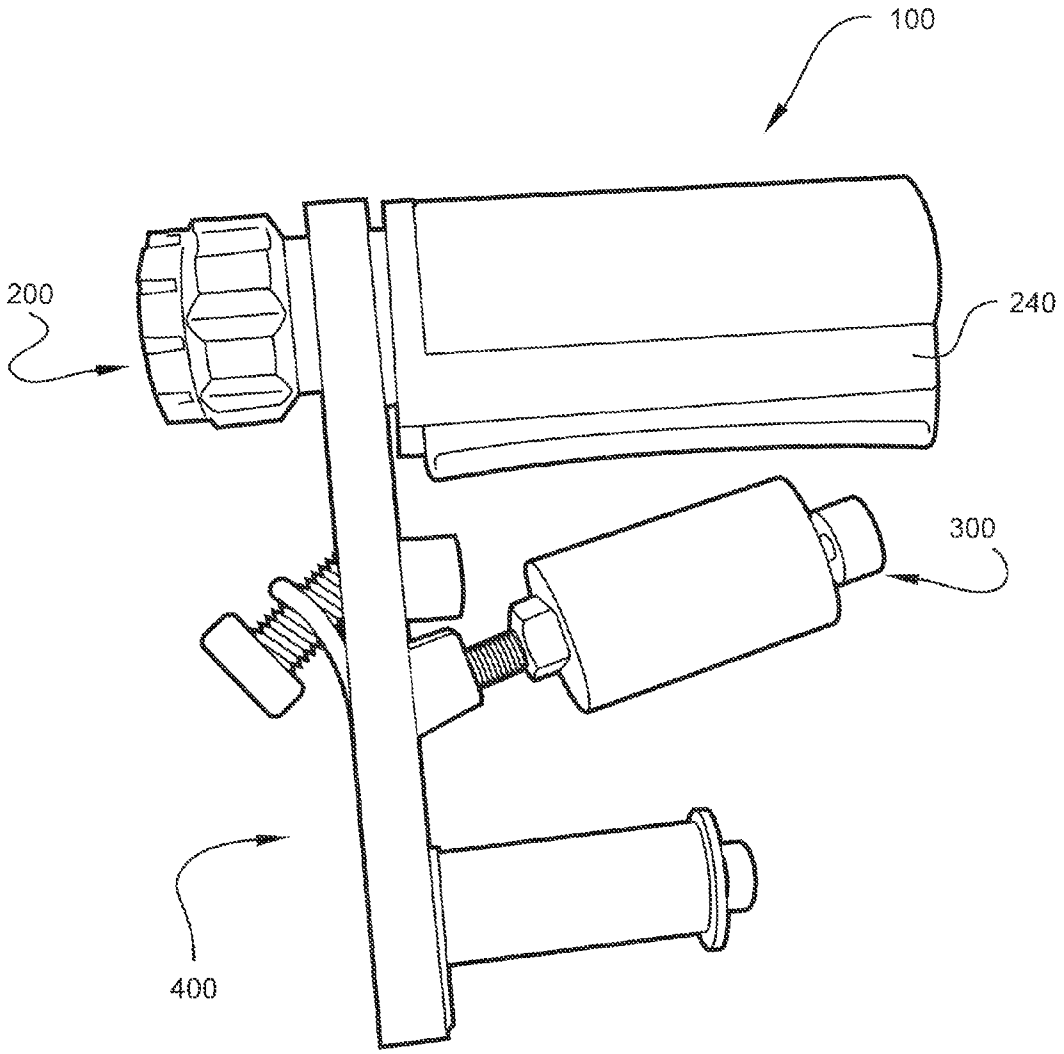
FIG. 12 is a perspective view of another preferred embodiment of the present invention.
Figure 13:
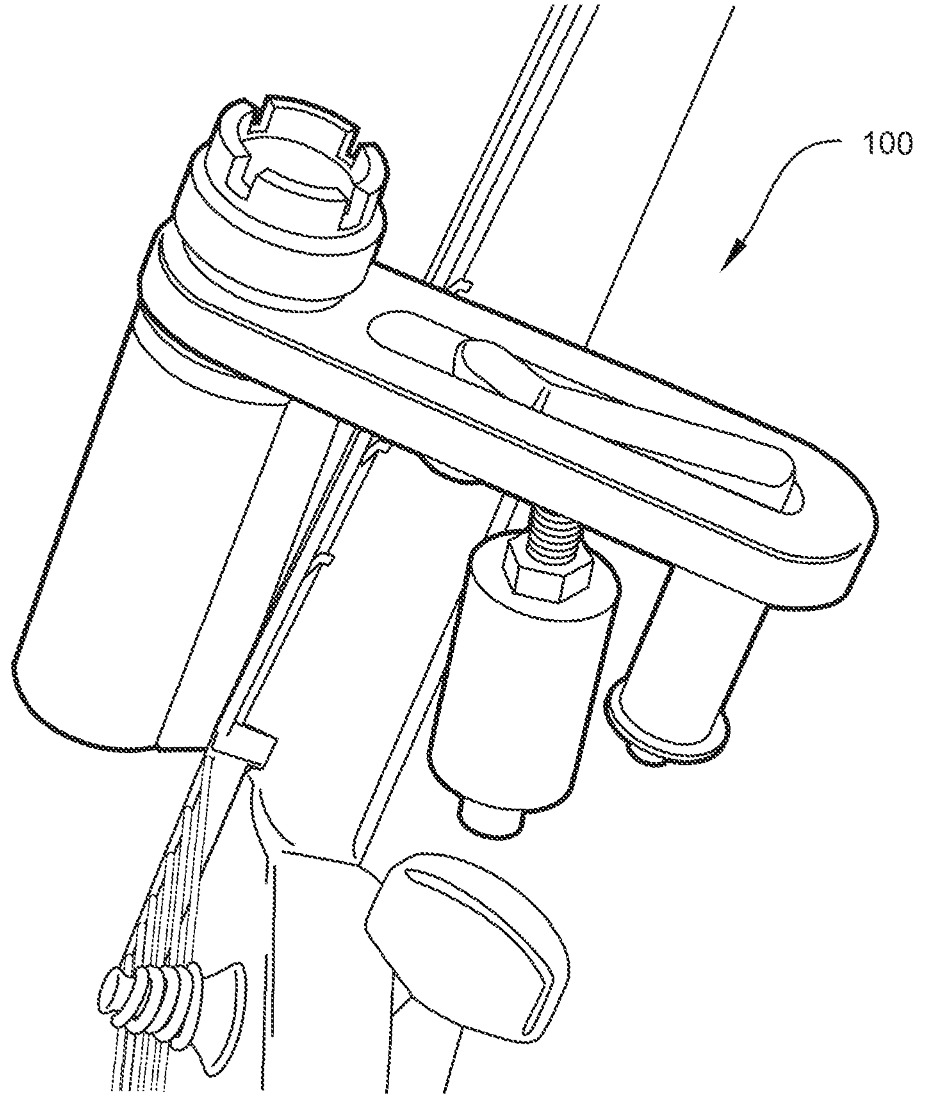
FIG. 13 is another perspective view of the present invention of FIG. 12.
Figure 14:
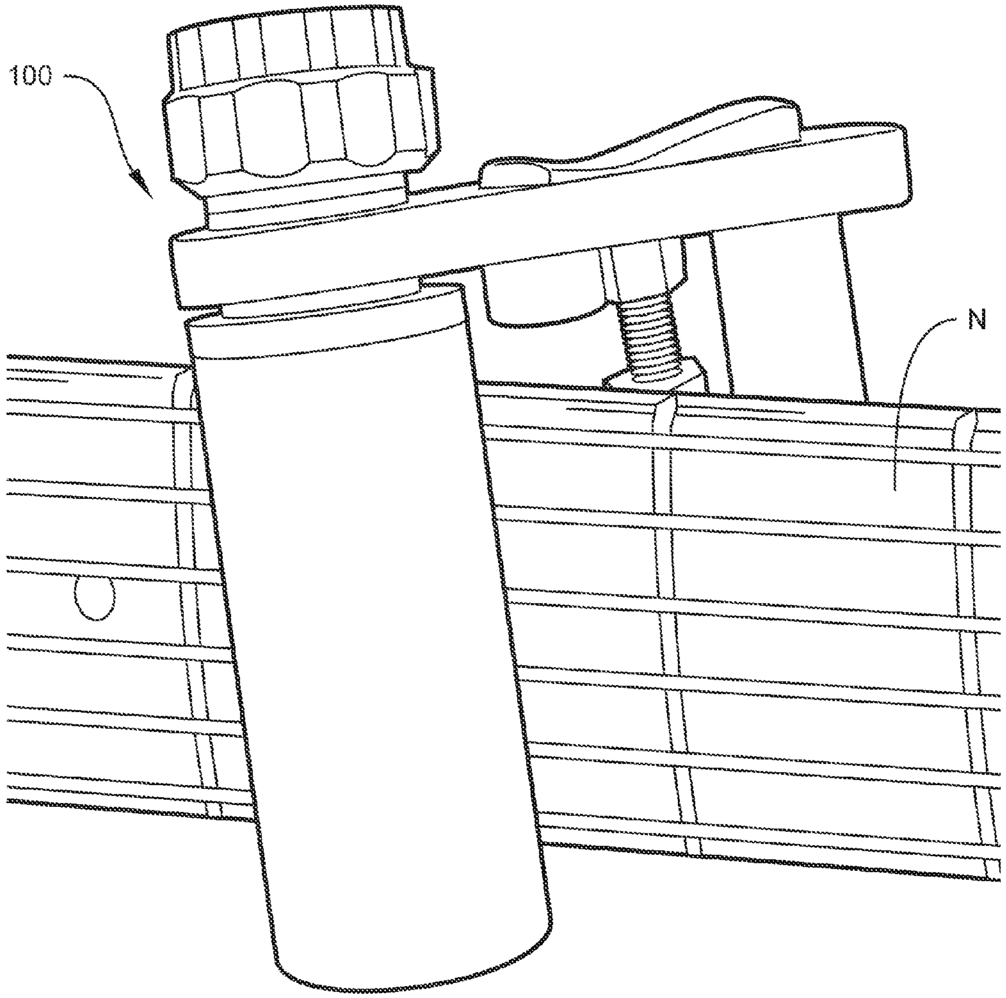
FIG. 14 is another perspective view of the present invention of FIG. 12.
Figure 15:
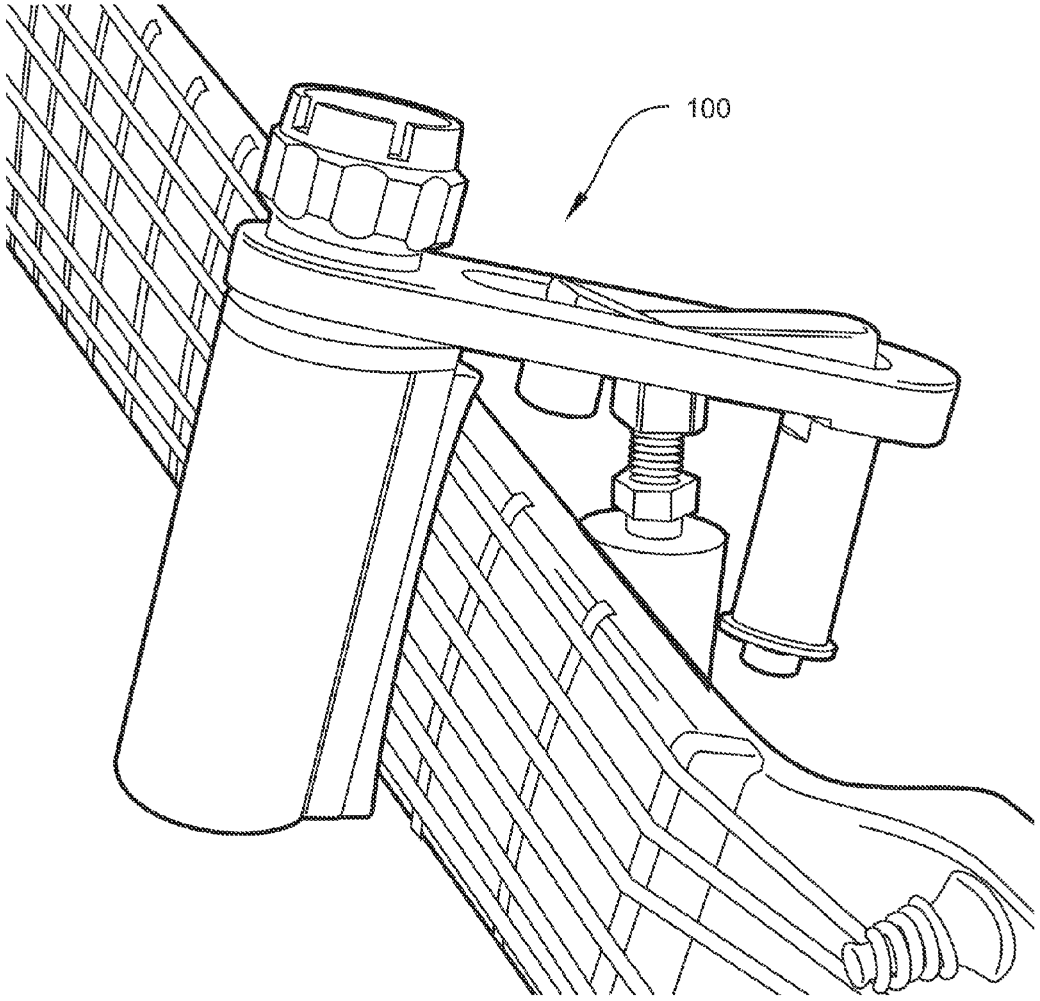
FIG. 15 is another perspective view of the present invention of FIG. 12.

FIGS. 11A and 11B are illustrations of the accessory of FIG. 6 before (FIG. 11A) and after (FIG. 11B) its repositioning along the neck of the instrument.

Generally, the assembly can be attached to the neck of a string instrument in many manners that allow the body portion 200 to contact the strings when in use. In embodiments having one connection, the assembly can be attached by a clamping mechanism, such as a spring. In embodiments having two connections, the assembly can be attached to the neck of a string instrument by detaching at least one end of one connection, and reattaching the connection after placing the accessory on the neck of a string instrument. In one embodiment, the at least one connection is detachably attached to the body portion. In another embodiment, the at least one connection is detachably attached to the roller.

FIGS. 12-15 illustrate another exemplary embodiment of the present invention.

Generally, the assembly described herein can be used on any string instrument. Non-limiting examples of string instruments upon which the accessory described herein may be used include the following: acoustic guitar, electric guitar, violin, viola, cello, bass, dobro, banjo, and ukulele.

While the present invention may be embodied in many different forms, disclosed herein are specific illustrative embodiments thereof that exemplify the principles of the invention. It should be emphasized that the present invention is not limited to the specific embodiments illustrated.

What is claimed is:

1. An accessory for a stringed instrument comprising:

a body portion incorporating a first surface capable of altering the position or sound of one or more strings of an instrument;

a clamping portion placing the first surface of the body portion in proximity to one or more strings of an instrument, and maintaining the placement of the first surface until readjusted or repositioned;

a body portion adjustment control mechanism enabling a user to control the positioning of the body portion to one or more strings of a stringed instrument; and a connecting portion connecting the body portion to the clamping portion;

wherein the accessory is configured to be repositionable along a neck of a stringed instrument without being detached from the neck of the instrument.

2. The accessory of claim 1, wherein the first surface is substantially curved.

3. The accessory of claim 1, wherein the first surface forms a cylinder.

4. The accessory of claim 1, wherein the first surface comprises a stringed instrument slide.

5. The accessory of claim 1, wherein the first surface comprises a stringed instrument capo.

6. The accessory of claim 1, wherein the connecting portion comprises one or more connection points between the body portion and the clamping portion.

7. An accessory for a stringed instrument comprising:

a body portion incorporating a slide and capo, wherein the slide comprises a cylindrical body connectable to the connecting portion via a stob insertable into an end of the slide;

a clamping portion for clamping the body portion to a stringed instrument, and maintaining the placement of the body portion until readjusted or repositioned;

a connecting portion connecting the body portion to the clamping portion; and a body portion adjustment control mechanism enabling a user to control which portion of the body portion to place in proximity to one or more strings of a stringed instrument.

8. The accessory of claim 7, wherein the capo comprises a capo bar having a trough and a cylindrical end piece.

9. The accessory of claim 8, wherein the capo further comprises a capo damper receivable in the trough, the capo connectable to the connecting portion via the cooperative engagement of a stob insertable into an end of the slide and the cylindrical end piece.

10. The accessory of claim 7, the clamping portion comprising an axle and roller, the body portion in proximity to a stringed surface of a stringed instrument having one or more strings, and the clamping portion in proximity to a back surface of the stringed instrument.

11. The accessory of claim 7 further comprising a rocker assembly including the body portion adjustment control mechanism, the rocker assembly for positioning the body portion into a slide mode and a capo mode.

12. The accessory of claim 11, wherein the rocker assembly comprises:

a saddle;

rocker;

pivot;

a body portion connection assembly;

a clamping portion connection assembly; and the body portion adjustment control mechanism.

13. The accessory of claim 12, wherein the saddle and rocker are connected via the pivot comprising a rocker pivot pin; and wherein a body portion side of the rocker assembly is attached to the body portion via the body portion connection assembly including the connection of a portion of a stob insertable through an aperture in the body portion side of the rocker assembly, and capped with a capo knob.

14. The accessory of claim 13, the clamping portion comprising an axle and roller;

wherein the a clamping portion side of the rocker assembly is attached to the clamping portion via the clamping portion connection assembly including the connection of a portion of the axle and the rocker; and wherein a rocker portion of the axle is threaded and threadingly engages a cooperative portion of the rocker extending below the pivotal connection of the saddle to the rocker.

15. The accessory of claim 14, wherein the body portion adjustment control mechanism comprises a capo adjustment, and a slide adjustment and knob;

wherein the capo adjustment comprises a capo adjustment screw threadably engagable with a capo adjustment aperture in the rocker, the capo adjustment screw capped with a bump stop attached to saddle; and wherein the slide adjustment comprises a slide adjustment screw threadably engagable with a slide adjustment aperture in the rocker.

16. An accessory for a stringed instrument comprising:

a body portion incorporating a slide and capo, the body portion placeable in proximity to a stringed surface of a stringed instrument having one or more strings, wherein the slide comprises a cylindrical body with a bore and connectable to the connecting portion via a stob insertable into an end of the slide, wherein the capo comprises a capo bar having a trough, a cylindrical end piece, and a capo damper receivable in the trough, the capo connectable to the connecting portion via the cooperative engagement of a stob insertable into an end of the slide and the cylindrical end piece;

a clamping portion for clamping the body portion to a stringed instrument, and maintaining the placement of the body portion until readjusted or repositioned, wherein the clamping portion comprises an axle and roller, and wherein the clamping portion is placeable in proximity to a back surface of the stringed instrument; and a rocker assembly connecting the body portion to the clamping portion, and for positioning the body portion into a slide mode and a capo mode.

17. The accessory of claim 16, wherein the rocker assembly comprises a saddle, rocker, pivot, a body portion connection assembly, a clamping portion connection assembly, and a body portion adjustment control mechanism;

wherein the saddle and rocker are connected via the pivot comprising a rocker pivot pin;

wherein a body portion side of the rocker assembly is attached to the body portion via the body portion connection assembly including the connection of a portion of a stob insertable through an aperture in the body portion side of the rocker assembly, and capped with a capo knob;

wherein a clamping portion side of the rocker assembly is attached to the clamping portion via the clamping portion connection assembly including the connection of a portion of the axle and the rocker;

wherein a rocker portion of the axle is threaded and threadingly engages a cooperative portion of the rocker extending below the pivotal connection of the saddle to the rocker;

wherein the body portion adjustment control mechanism comprises a capo adjustment, and a slide adjustment and knob;

wherein the capo adjustment comprises a capo adjustment screw threadably engagable with a capo adjustment aperture in the rocker, the capo adjustment screw capped with a bump stop attached to saddle; and wherein the slide adjustment comprises a slide adjustment screw threadably engagable with a slide adjustment aperture in the rocker.

18. The accessory of claim 17, wherein the slide comprises a material selected from the group consisting of metal, glass, and polymeric material; and wherein the capo damper comprises a material selected from the group consisting of rubber, leather, another polymeric material, and another natural material.

19. The accessory of claim 17, wherein the accessory is configured to be repositionable along a neck of a string instrument without being detached from the neck of the instrument.

20. The accessory of claim 1, wherein the body portion adjustment control mechanism comprises at least one spring, a user controlling the positioning of the body portion to one or more strings of a stringed instrument via adjustment of the tension of at least one of the at least one spring.

* * * * *